Dec. 26, 1967 A. SERAGNOLI 3,360,100
TRANSFER MECHANISM FOR ARTICLES TRAVELLING FROM A
DELIVERY MACHINE TO A RECEPTION MACHINE
Filed May 2, 1966 5 Sheets-Sheet 1
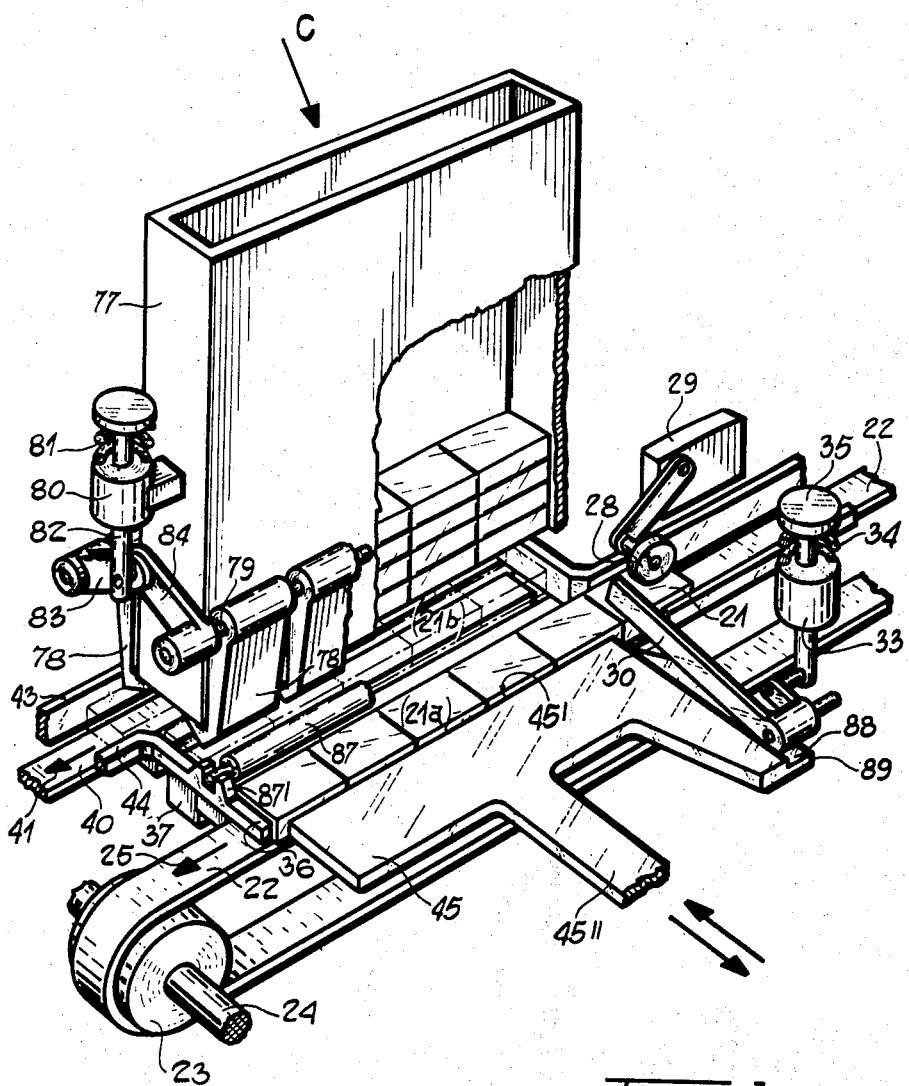
Fig. 1
INVENTOR.
Ariosto Seragnoli
BY
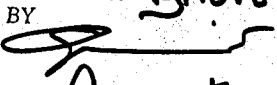
Agent INVENTOR.
Ariosto Seragnoli
BY
Agent Dec. 26, 1967

A. SERAGNOLI 3,360,100

TRANSFER MECHANISM FOR ARTICLES TRAVELLING FROM A
DELIVERY MACHINE TO A RECEPTION MACHINE

Filed May 2, 1966

INVENTOR.
Ariosto Seragnoli
BY
Agent

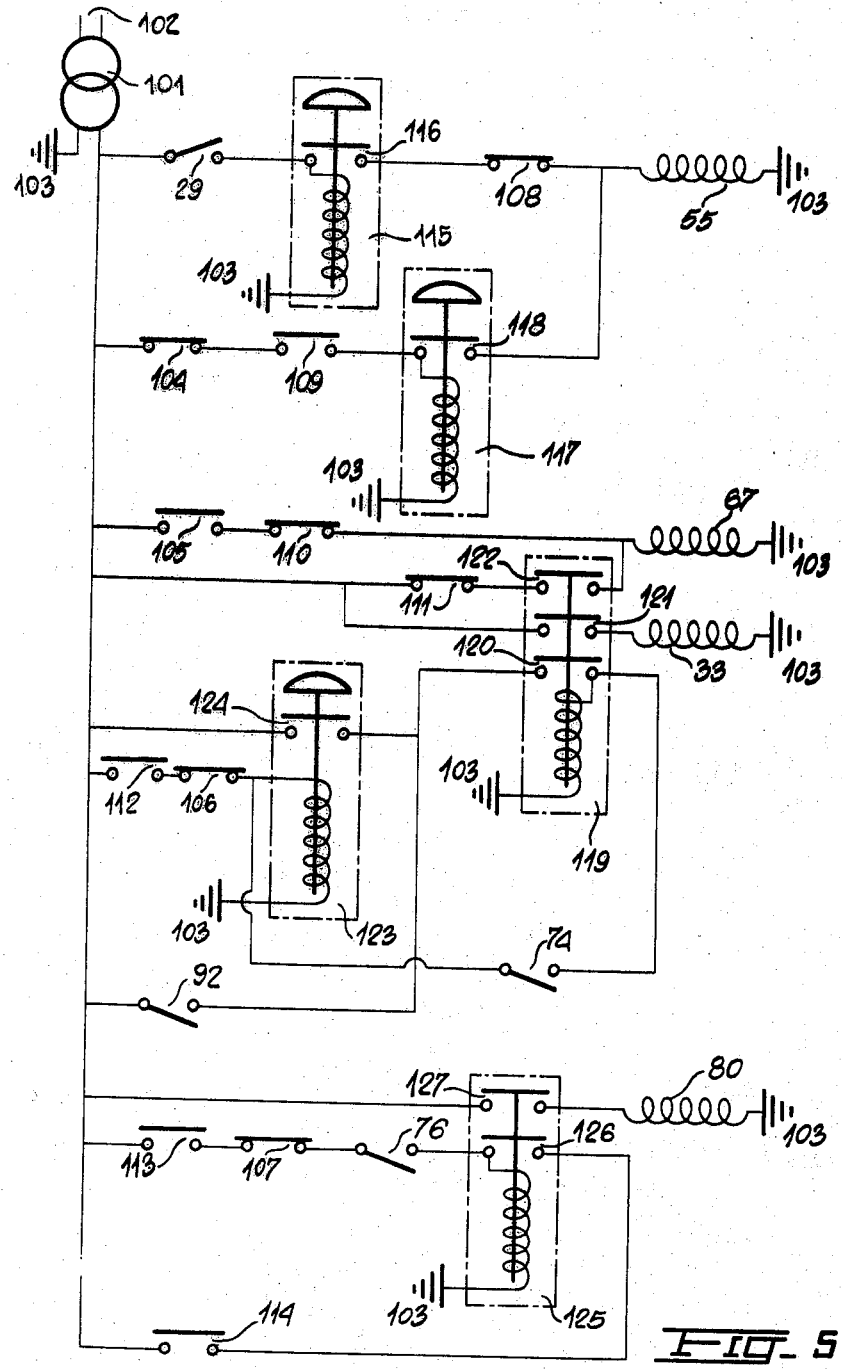

United States Patent Office 3,360,100
Patented Dec. 26, 1967

3,360,100
TRANSFER MECHANISM FOR ARTICLES TRAVELLING FROM A DELIVERY MACHINE TO A RECEPTION MACHINE
Ariosto Seragnoli, Bologna, Italy, assignor to G.D. Società in Accomandita Semplice di Enzo Seragnoli e Ariosto Seragnoli, Bologna, Italy
Filed May 2, 1966, Ser. No. 546,969
5 Claims. (Cl. 198—24)

ABSTRACT OF THE DISCLOSURE

This invention relates to a transfer mechanism for articles travelling from a delivery machine to a reception machine comprising a conveying belt for moving the articles from a delivery machine towards a transfer station and a transfer belt for moving the articles from the transfer station to the reception machine. A storage magazine is provided above the transfer station, the magazine having a width sufficient to contain sets of articles charged together. Furthermore a pusher member positioned at the transfer station is provided to transfer a set of articles from said conveying belt to said transfer station and belt. In addition, an elevator is provided at said transfer station and aligned with said storage magazine underlying the said storage magazine. Driving and control means being further provided for actuating and moving the operative members of the mechanism.

---

In the field of automatic packaging machines, there is a tendency to automatically transfer the articles from a machine or set of machines, which are hereinafter referred to as delivering or delivery machines, to machine, hereinafter referred to as a receiving or reception machine, in order to undergo subsequent operations.

In order to harmonize the operations of said machines, it is necessary, in such a case, to compensate for the difference in the output of the delivering machines and the input of the receiving machines.

To this end, it is known to utilize transferring mechanisms provided with compensating storage means, which however are unsatisfactory, because of either having an inadequate and limited storing capacity for practical operation, or being exceedingly complicated and precarious and unreliable in operation.

The subject matter of the present invention is a conveying mechanism having automatic compensation magazine means of high storing capacity and maximum simplicity, suitable for efficient automatic transfer of objects.

The receiving and delivering machines and the transfer mechanism are controlled by independent motors, which makes the installation according to the invention, practical and easy to handle.

According to a preferred embodiment of the invention, the input capacity of the receiving machine is somewhat larger than the conveyance capacity of the transfer mechanism, and the latter is somewhat larger than the output capacity of the delivering machines, this in order to avoid overcrowding.

An embodiment of the present invention is described in the following description with reference to the accompanying drawing in which:

FIG. 1 is a diagrammatic perspective and partial view of the mechanism;

FIG. 5 is a basic wiring diagram of a circuit for controlling the operation of the several parts.

In the various figures, like numerals correspond to like parts.

Figure 2:
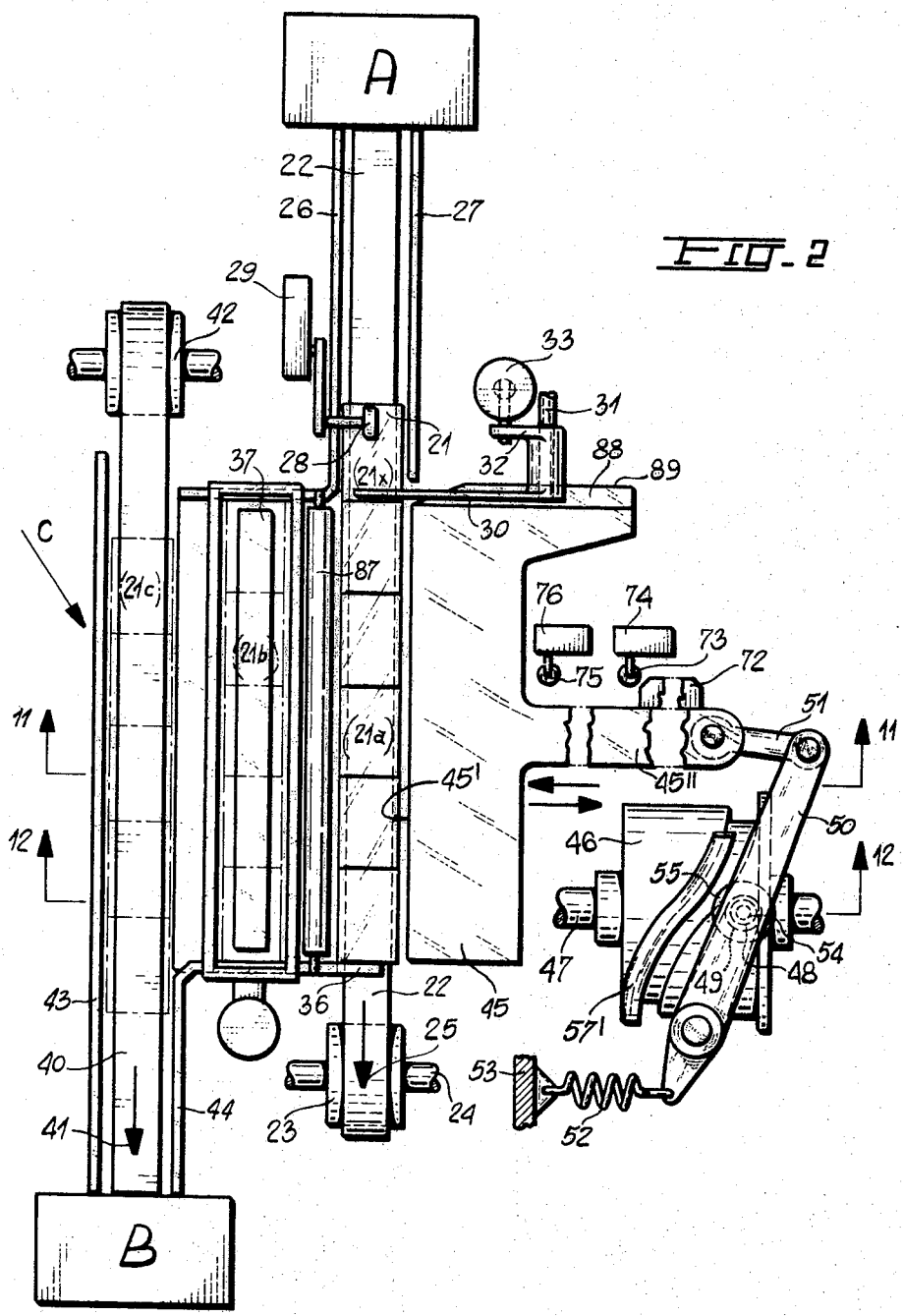
FIG. 2 is a diagrammatic and partial horizontal cross sectional view of the mechanism according to line 10—10 of FIG. 3.

The described stationary and movable portions are fixed to, and respectively guided within, a stationary base for the machine (not shown in the figures).

At A there is indicated the delivering machine for the articles which, through the conveyor mechanism are to be forwarded to the receiving machine, designated at B. C indicates in general a station for the conveying mechanism.

The invention will be described by following the travel of the articles, indicated at 21. Numeral 22 indicates a conveyer belt wound over a pulley 23 carried by a shaft 24, rotatable on stationary bearings (not shown) and rotated by means not shown, and over an idling pulley (not shown).

The upper strand of the conveyer belt 22 moves in the direction of arrow 25 and conveys the articles 21 (delivered by the machine A and urged onto the belt 22 by usual means, not shown) to the station C.

On the sides of the conveyer belt 22, there are arranged side walls 26, 27 forming a passage or channel for guiding the advancing movement of the articles 21. The bottom of this channel is constituted of the conveyer belt 22.

In the path of the conveyer belt 22, in the direction of the motion of the articles, there are subsequently encountered:

(a) A sensitive feeler means 28 operating an electric switch 29.

Said feeler means bears upon the articles advancing on the conveyer belt 22 and can take two positions, that is, a lower position in which switch 29 will be open when there are no articles beneath the feeler means, and an upper position in which the switch 29 will be closed when there are articles beneath said feeler means;

(b) A stop bar 30, oscillating about the stationary shaft 31 and rigidly connected to a lever 32. Lever 32 is in turn connected to the armature of the electromagnet 33. The armature is biased by a return spring 34 antagonizing between the head 35 of said armature and the electromagnet body (see FIGURE 1).

When the electromagnet is not energized, said bar 30 is under the action of said spring at the position shown in FIG. 1, outwardly of the path of the articles 21 and does not prevent them to advance; instead, when the electromagnet 33 is energized, bar 30 is urged into the path of the articles 21 preventing them to advance.

When bar 30 is raised, FIG. 1, the conveyer belt 22 carries the articles 21 up to a stationary stop 36, against which said articles will stop at the position 21a, accumulating backwards thereto onto said conveyer belt 22 running therebelow.

Figure 6:
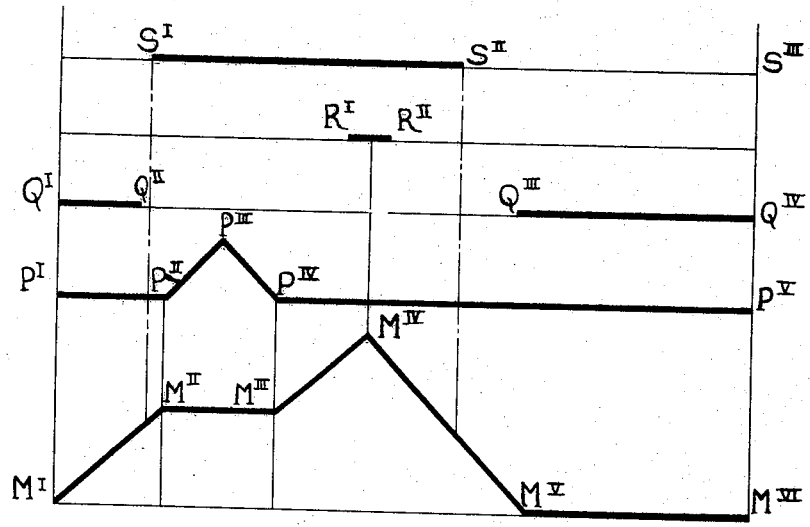
FIG. 6 is a timing diagram of the movement stages for some members of the mechanism.

The velocity of belt 22 is sufficiently high so that a train of five articles, the first of which occupies position 21x in FIG. 2, may arrive from position 21x to the stop 36 within the time $M^V-M^{VI}$ (FIG. 6).

The side walls 26, 27 do not extend beyond bar 30 at the station C. Thus they leave free a space between stop 36 and bar 30 corresponding to a pre-determined number of articles; in the figures said space will correspond to five articles.

At the above station C, sideways of the conveyer belt 22, there is arranged a vertically moving elevator 37, which is flanked by stationary bearing ledges or supporting elements 38, 39.

At the side of ledge 39 there is arranged a second or transfer belt 40, the upper strand of which is at a somewhat lower level than that of ledge 39 and which moves in the direction of arrow 41, and is wound over an idling pulley 42 and over a driving pulley, not shown, said belt carrying the articles to the receiving machine B.

On the sides of said belt 40, there are arranged a side wall or side board 43, extending from station C to machine B, and a side wall 44, extending from stop 36 to machine B (see FIGS. 1 and 2).

At the stretch of the belt 40 running in front of the station C, the banked ledge 39 serves as a guiding side wall or side board for the articles entrained by said belt.

Figure 3:
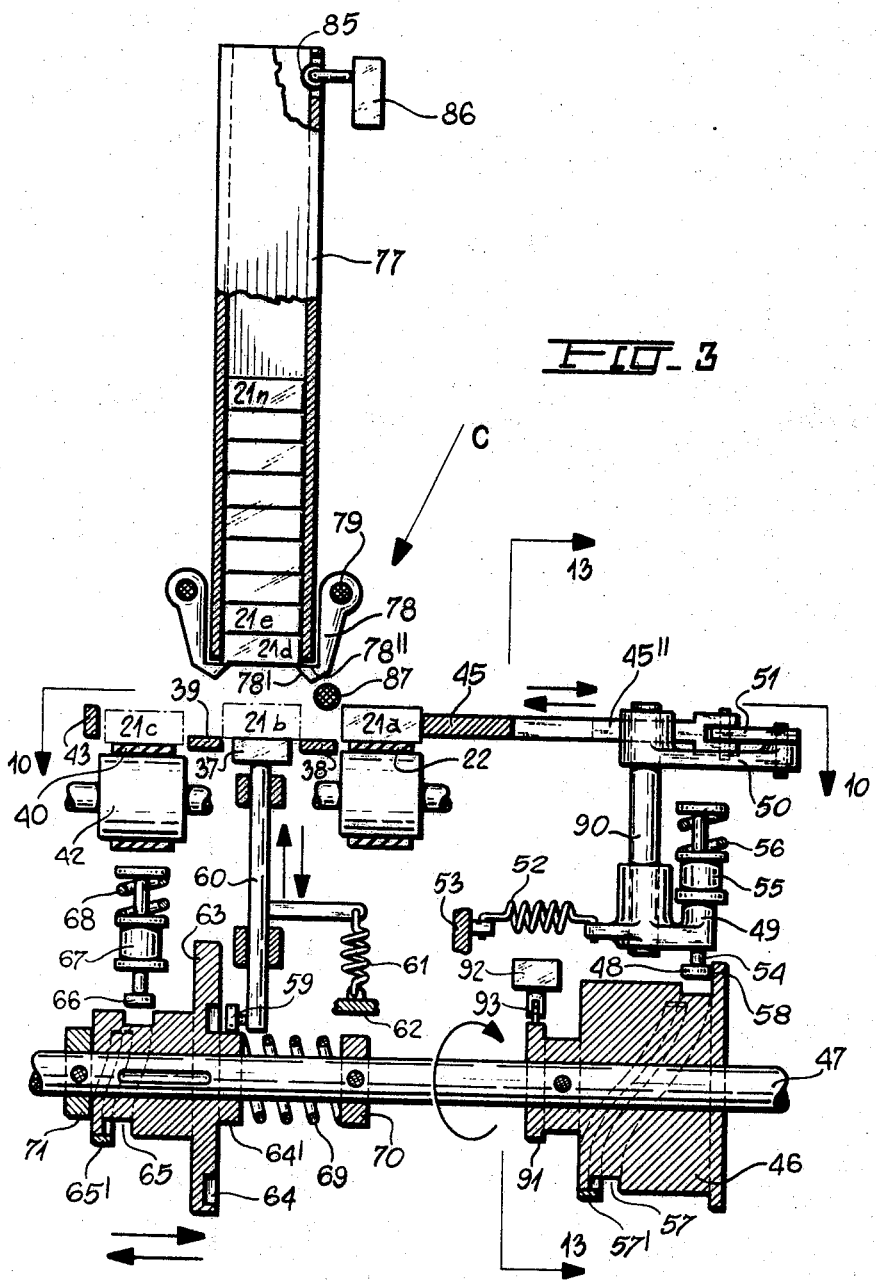
FIG. 3 is a diagrammatic and partial vertical cross sectional view of the mechanism, taken according to lines 11—11 (top portion of FIG. 3) and 12—12 (bottom portion of FIG. 3) of FIG. 2.

A horizontally moving pusher 45 operates at station C and transverse to the aforesaid belts 22, 40, said pusher being carried by a stem 45" guided within the base and movable from the position shown in FIG. 2 to an end position, wherein the front 45' thereof is in line with the contiguous side surfaces of the articles in the position 21c shown in FIGS. 2 and 3.

The velocity of belt 40 is sufficiently high in order that all the articles 21 thereto transferred to position 21c by pusher 45 be carried away from the zone facing said pusher in a period which is shorter than the time $M^{IV}-M^{VI}-M^{I}-M^{III}$, see FIG. 6 wherein times are indicated as abscisses, and the base is equal to the period of a cycle.

The front 45' of the pusher is as long as the line of articles in position 21a (see FIG. 2).

That sidewall 89 of the pusher 45 which extends transverse to the travelling direction of the articles coming from machine A is of such a length as to face the arrival of the articles 21 and to stop the same for all the time that the pusher is moved leftwards.

The sidewall 89 of the pusher has a recess 88, involving a portion of the pusher thickness, and extending throughout the length of the sidewall 89. This recess receives the lower portion of bar 30 when in a lowered position.

Figure 4:
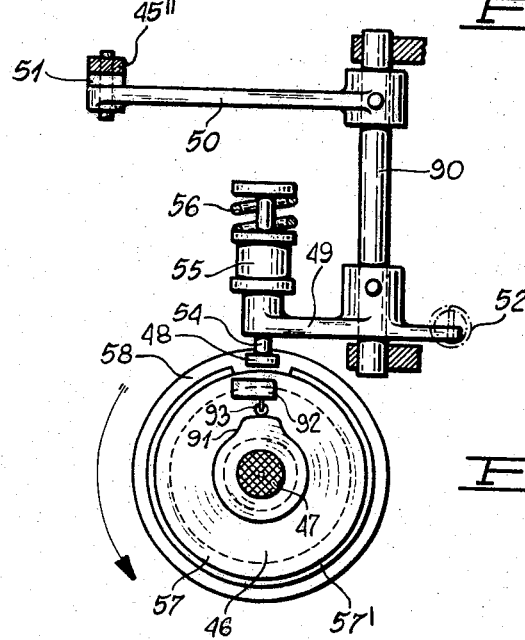
FIG. 4 is a partial diagrammatic vertical cross sectional view according to line 13—13 of FIG. 3.

Pusher 45 (see FIGS. 3 and 4) is driven by a cam 46 provided with a groove 57, said cam being rigidly connected to a shaft 47 performing one revolution for each operative cycle of the mechanism. Motion is transmitted from cam 46 to pusher 45 through a roller 48, the rocking levers 49 and 50 pivoted onto the shaft 90, and a connecting rod 51. The system is subjected to the action of a return spring 52 connected to the base at 53.

Roller 48 is carried by a shaft 54, vertically slidable within the end portion of lever 49, and connected with the armature of an electromagnet 55, and is subjected to the bias of a spring 56 which, when the electromagnet 55 is not energized, holds shaft 54 upwards at the position shown in FIG. 3, wherein roller 48 is outside the groove 57 of the cam 46.

In such situation, roller 48 is kept urged against the edge 58 of cam 46 because of the bias of spring 52, and through the idling connecting rod and levers the pusher 45 is held in the position at right, shown in the figures.

When the electromagnet 55 is energized, shaft 54 is downwardly urged and roller 48 moves downwards to engage within groove 57, causing the pusher 45 to be moved. The electromagnet 55 oscillates then jointly with the lever 49. On the open edge of the groove 57, there are arranged strips 57', which are interrupted only at one portion thereof and which provide a partial dovetail closing for the groove 57.

Such strips allow the roller 48 to enter the groove only at the aforesaid portion, corresponding to the position shown in FIG. 3 and once the roller has entered will prevent the egressing thereof until the whole movement cycle $M^I-M^{II}-M^{III}-M^{IV}-M^V$ is completed.

Groove 57 is so shaped that the forward movement of the pusher occurs in two periods (see lower curve of FIG. 6) n wherein the right to left displacements of the pusher 45 are indicated as ordinates, with an advancement in the periods $M^I-M^{II}$ and $M^{III}-M^{IV}$, and a pause or stop in the period $M^{II}-M^{III}$. In fact groove 57 has even cam surface portions which cause the stopping of the pusher.

In the subsequent period $M^{IV}-M^V$ the pusher returns to the right position where it stands still for the period $M^V-M^{VI}$ until the end of the cycle.

The advancement M'M" is such that the articles 21 are brought from position 21a to position 21b on the elevator 37 (see FIGS. 2 and 3), where they stop for the period M"M"'. The further advancement $M^{III}-M^{IV}$ is such that the articles 21 are brought from position 21b to position 21c on the belt 40 (see FIGS. 2 and 3).

The frequency of the cycles is selected so high that, should the pusher carry forward a train full with articles at each cycle, it would have a somewhat larger capacity than the delivery of machine A.

Above the elevator 37 and aligned with the articles at the position 21b, is a vertically channel shaped absorption magazine 77, suitable for receiving the articles from below and for containing them at the positions 21d, 21e . . . 21n, the articles coming from the position 21b, and being lifted into the magazine by the elevator 37.

At the lower level of the absorption magazine 77 there are arranged springing teeth 78, having the lower ends provided with invitation or inlet taper means 78' for automatically opening said teeth when the articles 21b are upwardly urged, and with hooks 78" for holding the articles at the position 21d, after the elevator 37 has lifted them above said hooks.

Teeth 78 are carried by shafts 79, which are oscillating within stationary bearings and connected to levers 83, 84 upwardly urged through the connecting rod 82 by the spring 81, acting against the stationary body of an electromagnet 80, to the armature of which the connecting rod 82 is connected.

Spring 81 maintains resiliently closed the teeth 78, which can however open under the thrust of the upwardly urged articles 21b against the invitation means 78', and close again beneath the articles when they reach the position 21d. To this end, the head of the elevator 37 is somewhat narrower than that of articles 21 (see FIG. 3).

When energized, the electromagnet 80 will attract its armature, and overcoming the force of spring 81 will urge the connecting rod 82 and levers 83, 84 downwards, causing the rotation of the shafts 79 and the opening of the teeth 78, which release the lowering of the articles from the positions 21d, 21e . . . 21n within the magazine 77, to the position 21b.

At the top of the magazine 77 there is arranged a feeler device which penetrates with its head 85 into the space swept by the articles 21n within the magazine, and which is connected with a switch 86.

The head 85 is subjected to the return action of a spring, and can occupy 2 positions.

In the first position, shown in FIG. 3, the head projects into the magazine and the switch 86 is closed.

In the second position, when the articles 21n urge the head outwardly, said head will open the switch 86.

In an obvious and not shown manner, said switch is inserted into the electric control circuit for the machine A, so that when the switch opens it will cause machine A to be stopped.

The elevator 37 is carried by the rod 60, rectilinearly guided within the base and subjected to the downward return action of the spring 61 which is anchored to the base at 62.

The rod 60 carries a roller 59 facing a cam 63, rectilinearly slidable on the shaft 47, and which is provided with a groove 64 for engaging the roller 59 when the cam 63 is moved rightward.

In the position shown in FIG. 3, the roller is outside the groove 64 and bears onto the circular contour 64', coaxial with shaft 47, so that the elevator 37 is stationary at the low position of FIG. 3 with its upper edge in line with the ledges 38, 39.

When the cam 63 is moved rightward, the roller 59 engages the groove 64 and in the period $P^{II}$–$P^{III}$ (see FIG. 6) raises the elevator until the upper edge thereof is brought in line with the lower edge of the article at the position 21d (see FIG. 3), lowering it again to the position of FIG. 3 in the period $P^{III}$–$P^{IV}$ (FIG. 6).

In any case, during the periods $P^{I}$–$P^{II}$ and $P^{IV}$–$P^{V}$ the elevator is stationary at a low location.

That is, the raising and lowering of the elevator occurs within the interval of time $M^{II}$–$M^{III}$ (see FIG. 6), in which the pusher 45 will stop after having brought the articles 21 to the position 21b.

The cam 63, rectilinearly slidable onto the shaft 47, is urged leftward in the position shown in FIG. 3 to bear against a ring 71 rigidly connected with the shaft 47, by a spring 69 antogonizing between said cam and a further ring 70 rigidly connected with the shaft 47.

The cam 63 has a helical groove 65 suitable for engaging a roller 66, which is slidable in a radial direction with respect to the shaft 47.

Strips 65' are disposed on the edge of groove 65, said strips providing a partial dove-tailed closing for the groove, with the exception of an inlet length indicated at the top of groove 65 in FIG. 3.

Said strips allow roller 66 to enter groove 65 only at the aforesaid inlet length and, once the roller is in, will prevent the egressing thereof until the movement step $P^{II}$–$P^{III}$–$P^{IV}$ of the elevator 37 is completed.

Said roller 66 is carried by a shaft which is guided within the base and is rigidly connected with the armature of an electromagnet 67, the armature being subjected to the action of a spring 68 urging the whole element to the top position of FIG. 3, wherein the roller 66 is out of the groove 65.

Upon energization of the electromagnet 67, the armature will be downward attracted and by overcoming the resistance of spring 68 will bring roller 66 to engage the groove 65.

Upon rotation of shaft 47, the cam 63 will then be moved rightward to engage the roller 59 with groove 64 to operate elevator 37.

A cam 72 is fixed to the stem 45″ of the pusher 45, said cam subsequently actuating during pusher advancement, the sensitizing feeler devices 73, 75 for the operation of the switches 74, 76, which are closed when cam 72 actuates said sensitizing feeler devices and open again when the cam is withdrawn therefrom.

Thus, switch 74 is closed in the period $S^{I}$–$S^{II}$, that is to say for the period in which the side 89 of the pusher 45 has covered the channel or passage of arrival for the articles 21 at the position 21a; switch 76 is closed for the period $R^{I}$–$R^{II}$, that is when the pusher 45 is about to be at its stroke left end.

On the shaft 47 there is also fixed a cam 91, operating on the sensitizing feeler means 92 of an electric switch 93, causing the closing thereof in the period $$Q^{I}Q^{II} + Q^{III}Q^{IV}$$

of each cycle, while out of said period the switch 93 is open.

At the left edge of the articles at position 21a there is arranged a yieldable guide formed of an idle roller 87, which is supported at the ends thereof in two stationary forks 87′, allowing the rotation and raising thereof under the thrust of the articles 21a urged leftward by the pusher 45.

In the basic electric wiring diagram of FIG. 5, reference numeral 101 is a current transformer supplied by mains 102.

The secondary has a grounded terminal 103; all grounded terminals of the circuits are indicated by the same reference numeral 103.

Reference numerals 104, 105, 106 and 107 indicate auxiliary contacts operated by machine B.

Reference numerals 108, 109, 110, 111, 112, 113 and 114 indicate auxiliary contacts operated by machine A.

The auxiliary contacts are operated by the aforesaid machines so as to be in opening or closing position when the machines are working, and vice-versa when the machines are stationary.

In the diagram of FIG. 5, the aforesaid auxiliary contacts are shown in the position pertaining thereto when the machines are in working condition.

In the same FIG. 5, the reference numeral 115 indicates in general a relay which carries out instantaneously the opening action and delays the closing action which, when energized, will close contact 116 with a greater delay than the period required for a train of five articles 21 to pass under the sensitizing feeler device 28 and to reach position 21a against the stop 36, and when de-energized will instantaneously open the contact 116.

The reference numeral 117 indicates a similar instantaneous opening and delayed closing, which when energized will close the contact 118 with such a sufficient delay that an article being at the time of energization in any position between the machine A and stop 36 is brought against the stop 36 by the belt 22.

The reference numeral 119 indicates a relay having three contacts 120, 121 and 122 which are closed when the relay is energized and open when the relay is de-energized.

The reference numeral 123 indicates an instantaneous closing and delayed opening relay which, when energized, will instantaneously close the contact 124 and, when de-energized, will open said contact again with a delay greater than the period of the cycle.

The reference numeral indicates a relay having two contacts 126, 127, which are closed when the relay is energized and open when the same is de-energized.

The operation is as follows:

Assume that the machines A and B are in a working condition.

The articles 21, coming from the delivering machine A and advanced by the conveyer belt 22 up to the stop 36, lean against one another at the position 21a to form a complete train under the sensitizing feeler device 28.

At the length wherein side walls 26, 27 are lacking, the articles at the position 21a are held in aligned relationship between the front 45′ of the pusher and the roller 87 forming a movable containing side wall, beneath which said articles may pass, automatically raising it when forwardly urged by the pusher 45.

Until the line is completed, the sensitizing device 28 is raised and lowered whenever an article conveyed by the conveyer belt 22 passes therebelow, every time closing the switch 29 for a short period.

Delay of relay 115 is greater than the time being required for a five article train to pass, so that the passage of individual articles or in trains of a number less than five does not cause the closing of the switch 108.

When a line of articles is formed against the stop 36, the sensitizing feeler device 28 remains raised and the switch 29 closed, so that the contact 116 will close.

Through the contacts 29, 116 and 108, the latter being closed since machine A is in a working condition, the current will energize the clutch electromagnet 55 of the operating roller 48 for actuating the pusher 45.

Thereafter, at the first passage of the cam 46 through the position of FIG. 3, the roller 48 will enter the groove 57 and the pusher will effect a leftward travel, transferring all the articles in front of it from into position 21a to position 21b and subsequently to position 21c on the belt 40. In turn, belt 40 carries said articles to the machine B. During said transfer, the other articles 21 continuing to arrive on the conveyer belt 22 are kept stationary by the side edge 89 of the pusher.

The pusher will then return to the position of FIGS. 2 and 3, and the articles 21 on the conveyer belt 22 are brought to position 21a.

In the meanwhile, if so many articles are being accumulated on the conveyer belt that during and after said advancement there are always articles beneath the sensitizing device 28, the electromagnet 55 will remain energized and the pusher will perform one stroke for each cycle.

Instead, when during the advancement the continuity of the presence of the articles beneath the sensitizing device 28 is not maintained, switch 29 will open and cause the de-energization of the electromagnet 55 with the egressing of roller 48 from groove 57 and consequent interruption of the advancement of pusher 45.

In said working condition, the electromagnets 67, 80 and 30 are de-energized and hence the elevator is stationary, the teeth of the magazine are closed and the articles therein contained are stationary, the stop bar 30 is out of the path of the articles 21 and does not interfere with the advancement thereof.

Assume now that the receiver B will stop while the delivering machine A is working.

Positions of the contacts 104, 105, 106 and 107 will reverse, the closed ones will open, and vice-versa.

Contact 105 closes and causes energization of the electromagnet 67, which puts into motion the elevator 37.

The pusher 45 will go on working as before under the control of switch 29.

However, when said pusher brings the articles into position 21b, the elevator will intervene, which elevator, during the stop or pause M″–M‴ of the pusher, will raise them between the teeth 78, urging them within the invitation means 78′, causing said teeth to be opened, bringing them above the hooks 78″, where it will leave them, then going down again to the low position.

The further forward stroke of the pusher 45 is an idle stroke, and the supply of machine B will cease, since the elevator 37 is continuously working and every time that the pusher forwards articles to position 21b the elevator will accumulate them in the position 21d.

When machine B restarts, contact 105 re-opens and electromagnet 67 de-energizes.

Roller 66 remains engaged within the dove-tail of groove 65 under the strips 65′ until reaching the interruption, then emerges from the groove 65 and the elevator comes to a stop, and thus the first described operation begins again.

Assume now that from said position in which both machines are working the machine A will stop.

Positions of contacts 108, 109, 110, 111, 112, 113 and 114 are reversed, the closed ones will open, and vice-versa.

Opening of contact 108 causes roller 48 to be retracted out of groove 57, which roller emerges from the groove just on encountering the interruption of the dove-tail formed by the groove 47 with the strips 57′.

Thus, the pusher remains at a stop condition at the right.

At this point, two cases are to be discerned.

If the machine A stops while the pusher is stationary at the right, closing of the contact 109 causes relay 117 to be energized, however, as already stated, contact 118 closes only after a period, sufficient that an article which happens to be in any point between the machine A and stop 36 can reach said stop, has elapsed.

It is thus achieved that the pusher 45 restarts only after all the articles have accumulated one after the other up to and bearing against the stop 36, so that all the articles on arriving before the pusher will form a train of articles which are all together swept away up to the position 21c and supplied to the machine B.

The stopping of machine A causes also the contact 112 to be closed and relay 123 energized, which causes the immediate closing of the contact 124. However, this is effected only when the pusher is moved leftward for a distance necessary to bar with its edge 89 the arrival of the articles from machine A, and this is effective only in the period S′S″ (see FIG. 6).

At the first occurrence of said interval of time, the current passing through contact 74, which in said interval is closed, will energize relay 119 causing the closing of the self-excitation contact 120, which will maintain said relay energized until contact 124 re-opens, and the closing of the contact 121, through which the current will energize the electromagnet 33 and cause bar 30 to descend, which bar will enter the free space of notch 88 before the articles to prevent the further advancement of articles carried by the belt 22.

The stopping of machine A also causes contacts 113 and 114 to be closed and, when the pusher is completely to the left, that is in the period R′R″ in which contact 76 is closed, causes the energization of relay 125, which remains self-excited through contact 114, as well as the energization of the electromagnet 80 and opening of the teeth 78, remaining then open until machine A is stopped.

If the machine A, instead of stopping when the pusher 45 is staationary, stops when said pusher is engaged in the movement stop, closing of bar 30 and opening of teeth 78 would occur at the first overlapping of the respective periods S′S″–R′R″.

In any case, teeth 78, an opening thereof, allow the articles in the position 21d to descend along the back of the pusher 45, which articles will drop to the position 21b at the subsequent return of the pusher, and at the next advancement of said pusher will be brought to the position 21c and supplied to the machine B through the belt 40, and so on.

Assume now that the machine A is restarted to operation, whilst machine B is also in a working condition.

Contact 109 will re-open and de-energize the electromagnet 55 for the pusher, which having completed the eventual outstanding work cycle, will stop at the right.

Contact 108 will close again.

If there is at least one article beneath the sensitizing feeler device 28 said article being held by the bar 30, the contact 29 is closed, the electromagnet 55 will be re-energized and the pusher will restart, remaining otherwise stationary.

Contact 113 will open and de-energize relay 125, releasing current from the electromagnet 80.

Under the action of spring 81, teeth 78 will close again clamping the articles which are between the hooks 78″.

Contact 112 will open, but delay of relay 123 will keep contact 124 closed for at least one cycle, maintaining relay 119 in an energized condition through the self-excitation contact 120 and contact 121 closed, said contact maintaining the electromagnet 33 energized and the bar 30 and contact 122 closed, to which contact 122 current flows through the closed contact 111 to energize the working electromagnet 67 for the elevator 37.

Thus, at least one lifting stroke of the elevator 37 occurs, which carries the articles between the hooks of teeth 78 and the articles which may be present in the position 21b, above the hooks 78″, to position 21d.

Finally, when the delayed opening relay 123 reopens contact 124, relay 119 remains energized nevertheless, through the cam operated contact 93, which allows the de-energization and hence the opening thereof only in the period Q″Q‴.

Therefore, the control electromagnet 33 for the stop bar 30 will remain energized and keep said bar closed, which bar may open only in a period Q″Q‴, that is when the pusher, if forwardly running, prevents with its edge 89 the articles to be advanced, which articles cannot therefore get jammed or overcrowded before it, and anyhow ensures that, form the moment in which the articles are released to the moment in which a new advancement of the pusher begins, at least the time $M^V$–$M^{VI}$ will elapse, said time being sufficient for the articles released from the bar 30 to arrive just against the stop 36.

Thus, the normal operation of the mechanism will restart, with both the machines A and B in a working condition.

Having thus described the invention with reference to a preferred embodiment, it will be evident to the skilled in the art that many changes and modifications of the invention can be made, without departing from the scope of the invention.

It is particularly foreseen that:

The number of outlet passages or channels of the delivering machines may be whatever, there being in any case an equal number of magazines, elevators, pushers, etc.;

The station C may contain whatever number of articles in the position 21a;

The described operating systems may be replaced by any other known equivalent system;

The limitation of the inlet and outlet step of the rollers 48 and 66 within the respective grooves may be electrically achieved through cams carried by shaft 47, said cams operating assenting switches for the energization and de-energization of the respective electromagnets, as well as through corresponding exciting contacts and circuits;

The control circuit may also be otherwise carried out, there being, for instance, mechanical rather than electrical delays, etc., without departing from the scope of the invention.

I claim:

1. Transfer mechanism for articles travelling from a delivery machine to a reception machine and having a high capacity for automatic storage of articles comprising the combination of a conveying belt for moving the articles from said delivery machine, a subsequent transfer belt arranged in a side-by-side manner with said conveying belt and laterally spaced therefrom, a transfer station between said conveying belt and said transfer belt, a vertical storage magazine having a width sufficient to contain sets of articles charged together, releasable means on said magazine to selectively release said sets of articles, said storage magazine being arranged above said transfer station, a pusher member positioned at said transfer station, drive means to reciprocate said pusher member transversely of said belts to transfer a set of articles from said conveying belt to said transfer station underlying said storage magazine and from said transfer station to said transfer belt, an elevator positioned at said transfer station and aligned with said storage magazine, power means to reciprocate said elevator with a vertical reciprocating motion to move a set of articles from said transfer station into said storage magazine, whereby a set of articles may be selectively supplied to and withdrawn from said transfer station by said releasable means and said elevator, respectively, to maintain the flow of articles from said delivery machine to said reception machine substantially constant.

2. A transfer mechanism according to claim 1, wherein said drive means to reciprocate said pusher member transversely of said belts comprise means adapted to stop temporary said pusher in an intermediate position of the stroke thereof in which the articles pushed by said pusher are below said magazine.

3. A transfer mechanism according to claim 1, wherein said drive means to recoprocate said pusher member transversely of said belts comprise cam means having even cam surface portions adapted to stop temporary said pusher in an intermediate position of the stroke thereof in which the articles pushed by said pusher are below said magazine.

4. A transfer mechanism according to claim 1, wherein said transfer station comprises supporting elements for said articles at the same level with said conveying belt and a gap between said support elements allowing the passage of at least a portion of said elevator through said gap.

5. A transfer mechanism according to claim 1, wherein said transfer station comprises supporting elements for said articles at the same level with said conveying belt and a gap between said support elements allowing the passage of at least a portion of said elevator through said gap, and wherein said transfer belt is arranged at a level lower than that of said supporting elements, thereby among said supporting elements the nearest to said transfer belt forming an additional side board member, other side board members cooperating with said additional side board member and said transfer belt to form a guiding channel for said articles.

References Cited

UNITED STATES PATENTS 1,609,802   12/1926   Ekstrom _____ 198—24
3,040,862   6/1962   Schermund _____ 198—24

EDWARD A. SROKA, *Primary Examiner.*

EVON C. BLUNK, *Examiner.*